Patented Feb. 20, 1945

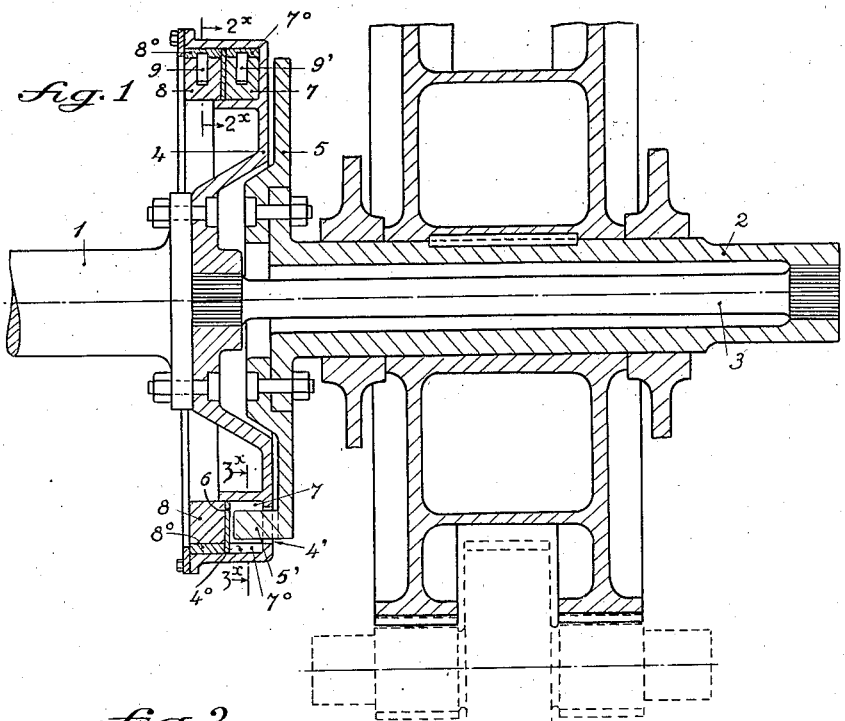
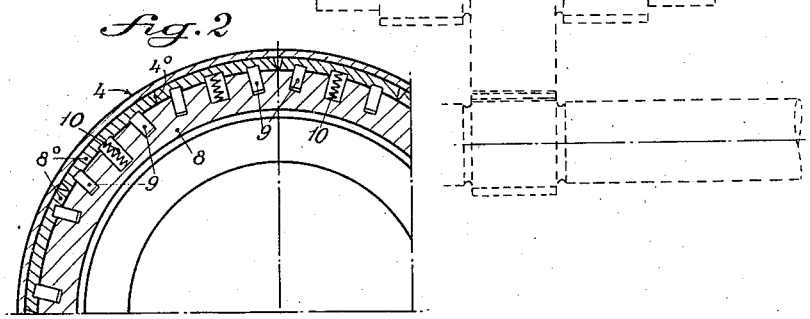
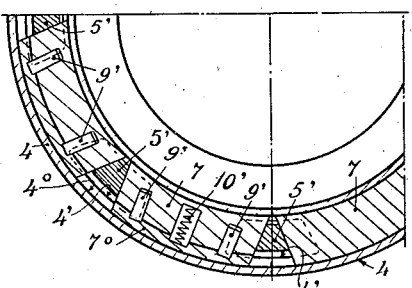

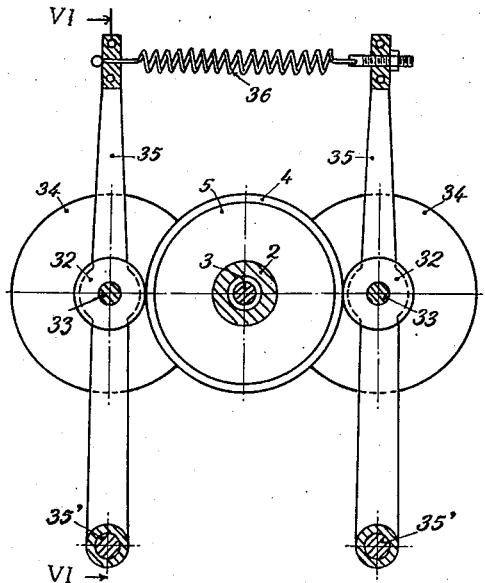
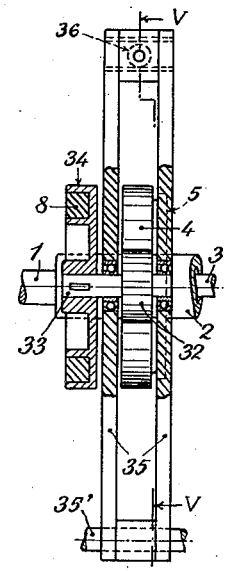
Fig. 5    Fig. 6
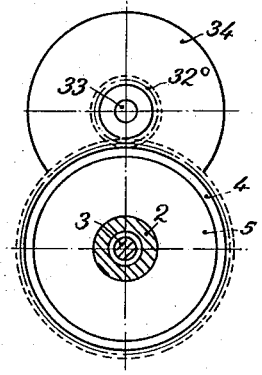
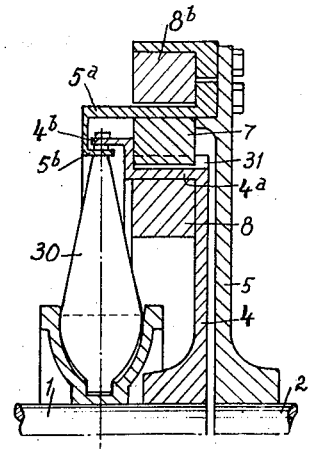
Fig. 7    Fig. 4

2,369,679

UNITED STATES PATENT OFFICE 2,369,679

UNIVERSAL DAMPER FOR THE TORSIONAL VIBRATIONS OF COAXIALLY REVOLVING SHAFTS

Raffaele Matteucci, Turin, Italy; vested in the Alien Property Custodian

Application November 16, 1939, Serial No. 304,835
In Italy November 19, 1938

2 Claims. (Cl. 74—574)

Dampers of the torsional vibrations of rotating shafts are known in which the passive work for the damping effect, done at the expense of the energy transmitted by them, is effected in dependence on angular displacements of masses, with regard to the shaft, set up by their inertia reactions to the disturbances of the rotary motion set up by the said torsional vibrations.

It is also a known practice to fit to the resilient joints of revolving shafts, dampers of the oscillatory deformations of the resilient parts producing passive work at the expense of the said deformations.

Neither of these types of damper is able to damp out all the torsional vibrations of shafts. The former damp out only those vibrations which present to them the loop zone in which, as it is known, the rotary motion of the shaft is disturbed angularly, while they are not responsive to those vibrations which present to them the node where the rotary motion is not disturbed. The latter behave in exactly the opposite manner, being quite insensible to those vibrations which occur to them in the loop, as they do not modify the couple acting on the resilient joint, but come into action if, at the point at which they are mounted, there happens to be a node or a prevalently nodal zone of vibrations, as in such zones the torsional vibrations develop in the shaft torsional stresses.

An object of the present invention is to provide a damper capable of acting universally on all torsional vibrations whether in a node or nodal zone, or in a loop or loop zone. Another object of the invention is to automatically vary the intensity of the damping effort in direct ratio to the variations in the speed of rotation. Another object is to be able to regulate the sensitiveness of the damper, and a further object is to be able to regulate this sensitiveness independently for the vibrations which act upon the damper in the loop zones and for those which act on it in the nodal zones.

This damper, which forms a group intended to be inserted between two coaxially rotating shafts, one driving and the other driven, is characterized by a selector consisting of a resilient deformable member mounted on the centre line of the shafts in such a manner as to be deformed in an oscillatory sense by the vibrations acting upon it with a node or with their nodal components, and by inertia masses angularly moveable around the shaft and arranged in such a way as to be moved in an oscillatory sense by those vibrations which act upon it by a loop or with their loop components. The selector is arranged in combination with damping members which transform the collected energy into passive work through the oscillatory deformations of the resilient member, and through the oscillatory displacements of the inertia masses.

Thanks to the selector formed by the resilient deformable member and the masses moving by inertia, there are collected on the kinetic energy transmitted along the centre line by all the torsional vibrations without distinction, two distinct and continuous currents of energy which are progressively transformed into passive work by the two transformer damper members, so that all the vibrations, without exception, are damped by the dissipation of the kinetic energy set up in them by the exciting impulses, or by opposing in other manner to the resonance.

The damping transformer members which produce the damping effort are preferably blocks arranged in a circle coaxially around the shaft. These blocks under the influence of centrifugal force or a combination of this and the action of springs or other known suitable means, press against the inner surface of an annular member which surrounds them and produce their effect by sliding backwards and forwards, under the influence of the resilient deformable member, or of the inertia masses.

Some forms of realization of the object of the invention are shown merely by way of example in the annexed drawing in which: Fig. 1 is a longitudinal section of one form of the universal damper; Figs. 2 and 3 are partial cross sections on the lines $2x$—$2x$ and $3x$—$3x$ of Fig. 1;

Fig. 4 is a longitudinal sectional view of another form of universal vibration damper.

Fig. 5 is a sectional view of a modification taken on the line V—V of Fig. 6.

Fig. 6 is a sectional view taken on the line VI—VI of Fig. 5.

Fig. 7 is an end view of a modified driving connection between the drum and the inertia masses.

In the form of execution shown, by way of example, in Fig. 1, the damper is applied on the line shafting of a turbine driven ship. The propellor shaft 1 is driven by the shaft 2 of an ordinary reducing gear driven by the turbine. In this application, the driving torque being constant and the resistant or load couple being also substantially constant and only disturbed by the rhythmic impulses of the screw in the water, the amount of kinetic energy transmitted by the torsional vibrations is relatively small and therefore the elastic deformable member which serves to select and collect by its deformations the kinetic energy of the vibrations acting with a nodal character, has but a slight elastic work to perform. It is therefore constituted only by a bar 3, stressed by the driving torque to a high specific torsion load and which therefore effects fairly ample torsional deflections in consequence of the disturbances of the rotary moment set up in it by the torsional vibrations of nodal character. This bar 3 is arranged inside the shaft 2 of the reducing gear, which is hollow, and coaxially therewith. The right hand end of the bar 3 engages the shaft 2 by means of grooves and its left hand end engages in a similar manner with a hub of a drum 4 fixed to the end of the propeller shaft 1. At the left hand end of the reducing gear shaft 2, opposite the bottom of the drum 4, is fixed a disc 5 which is provided with a number of teeth 5' regularly spaced and projecting from its left face. The teeth 5', through an equal number of slots 4' in the drum, penetrate for a certain distance into an annular recess 4° arranged in the periphery of the drum 4, which recess is preferably divided into two compartments by an intermediate diaphragm 6, loose with regard to the drum. Between the said teeth 5' are engaged angularly with regard to the centre line of the shaft, but free to move radially, an equal number of friction blocks 7 lodged in one of the two compartments of the recess 4°. These blocks 7, which form together a crown, make contact, with their faces furthest from the axis, with the inner surface of the peripheral recess 4° of the drum against which they are pressed in the manner which will be described later.

The nodal action vibrations disturbing the intensity of the driving torque applied to the elastic member 3, set up in it fluctuations of the deformations of the torsion and consequently cause a corresponding oscillatory displacement of the blocks 7 in the recess 4° of the drum 4. As these blocks are pressed against the inner surface of the recess 4° of the drum by centrifugal force, they produce, in their to and fro sliding on the said surface, the passive damping work on the nodal action vibrations.

Within the said recess 4° of the drum 4 is located, alongside the crown of blocks 7, a loose ring 8 which, reacting by inertia to the disturbances of the rotary motion set up in the drum 4 by the loop action vibrations, moves on it angularly with an oscillating motion. On this ring 8 is fitted a series of blocks 8° retained on the ring 8 in the direction of rotation by movable pins 9 lodged in substantially radial slots cut partly in the thickness of the ring 8 and partly in the thickness of the blocks 8°, which are thus free to move in a radial direction under the influence of centrifugal force and are pressed against the internal surface of the recess 4° of the drum 4. When, by reason of loop action torsional vibrations, the inertia ring 8 is subjected to oscillatory angular movements with reference to the drum 4, the blocks 8° rub with a reciprocating motion against the inner surface of the recess 4° and perform the passive work of damping the said vibrations. The pressure exerted by the blocks 8° on the inner surface of 4° by the action of the centrifugal force developed in them and on the moveable pins 9, can be eventually integrated by springs 10 also located in suitable recesses in the ring 8 and in the blocks 8°.

The blocks 7 are pressed against the inner surface of the recess 4° by the action of the centrifugal force set up in them during rotation. These blocks 7 can be provided, on their periphery, with a friction shoe 7°, similar to the blocks 8° of the inertia ring 8 and similarly retained on the relative block 7 by moveable pins 9' lodged in slots cut in part in the thickness of the block 7 and in part in the friction shoe 7°. In this case the pressure exerted by the block on the inner surface of the recess 4° is equal to the sum of the centrifugal actions developed in the block 7, in the friction shoe 7° and in the pins 9'. Also in this case the pressure exerted by the blocks 7 can be integrated by springs 10' lodged in suitable recesses in the block and in the friction shoe.

Thanks to the above described conformation the pressure with which both the blocks 8° of the inertia ring 8, and the blocks 7 with their friction shoes 7° are pressed against the inner surface of the recess 4°, abstraction made of the pressure exerted by the eventual springs 10 and 10', is furnished by centrifugal force and is therefore proportional to the square of the speed of rotation of the whole, so that also the damping effort is proportional, the displacement of the blocks being equal, to the square of the said speed.

In Fig. 4 is represented diagrammatically the application of the damper to two shafts 1, 2, subjected to a driving torque affected by strong cyclic irregularities, as would be the case, for instance, in the coupling together in tandem two Diesel engines without a flywheel. As in this case the quantity of kinetic energy transmitted by the vibrations is considerable, the elastically deformable member which serves to select and gather by its deformations the kinetic energy of the vibrations acting with a nodal character has to perform a very large amount of elastic work and has therefore to assume the constructional forms and dimensions of a real and true flexible coupling of considerable power. In this case, while one part of the elastic deformations is utilized to perform the work of damping the torsional vibrations, another part of it reduces the cyclic irregularities of the driving torque and of the rotary motion dependent upon it, thus attenuating the stresses set up by the torsional vibrations produced by the said irregularities.

In Fig. 4 is represented a coupling of the known type described in British Patents 508,425 and 510,104 which lends itself well to this application. Any other known type of flexible coupling may, however, be employed.

The inertia rings 8 and 8$^b$ with their relative blocks for the damping of loop action vibrations, in every way similar to those already described, are mounted respectively on the drums 4$^a$ and 5$^a$ of the discs 4 and 5 which carry respectively the lugs 4$^b$ and 5$^b$ engaging with the elastic members 30 of the joint.

The blocks 7 for the damping of nodal action vibrations, revolving together with the disc 4 by means of special engagement pieces 31 fixed to the drum 4$^a$, but free to move radially, act on the drum 5$^a$ revolving together with the shaft 2, through the joint action of oscillatory movements determined by the deformations of the elastic group caused by the nodal action vibrations, and by the pressure set up in them by any suitable means.

The assembly of the blocks which produce the damping effect forms three coaxial annular groups, located alongside the elastic group.

It is evident that, the lower the speed of the driving shaft, the larger must be the inertia masses of the selector intended to collect the kinetic energy of the vibrations acting on it with a loop or with loop components. In cases where the speed of the driving shaft is low it is therefore advantageous, in order to avoid the use of too large inertia masses, to increase the rotational speed of such masses, having recourse, for example, to the arrangement shown in Figs. 5 and 6 where the drum 4, rigid with the driven shaft 1, contains only the blocks for the damping of the nodal action vibrations. The drum 4 drives one or more adherence rollers 32, of smaller diameter, two in the example illustrated, held in close contact with its periphery by suitable means. For this purpose the rollers 32 are carried on the arms 35, oscillating about shafts 35', which tend to be drawn towards each other by a spring 36, so that the two rollers are held in adherence with the drum 4 at diametrically opposite points. On the spindle 33 of each of the said rollers is mounted a secondary drum 34 containing the mobile inertia masses 8. These masses, since they revolve at a higher speed than the driving shaft, are of a smaller size than they would have to be if they rotated at the same speed as the said shaft. Instead of rollers, toothed wheels 32° may be employed, engaging with teeth on the periphery of the drum 4, as shown in Fig. 7.

I claim:

1. A universal damper of torsional vibrations of coaxially rotating shafts comprising, a driven shaft and a driving shaft, an elongated resilient member connecting said shafts, a drum rotated by said shafts having circumferentially spaced slots therein, a disc rotated by said shafts and arranged adjacent said drum, circumferentially spaced teeth carried by said disc projecting into the slots of said drum, a plurality of circumferentially movable and radially movable friction blocks arranged within the drum and moved by said teeth, a ring arranged within said drum, and other blocks carried by the ring and adapted to move in radial directions under the influence of centrifugal force and to engage said drum.

2. A universal damper of torsional vibrations of co-axial rotating shafts comprising, a driving shaft and a driven shaft, means including a resilient member connecting said shafts for driving the driven member from the driving member, drum means surrounding the axis of the shafts, a disc rotatable with said shafts and arranged adjacent to said drum means, a plurality of circumferentially movable and radially movable friction blocks arranged within the drum means and operatively connected with said disc, a ring arranged within said drum means, and other blocks carried by the ring and adapted to move in radial directions under the influence of centrifugal force and to engage said drum means.

RAFFAELE MATTEUCCI.